US010050822B2

(12) United States Patent
Dong et al.

(10) Patent No.: US 10,050,822 B2
(45) Date of Patent: Aug. 14, 2018

(54) METHOD AND SYSTEM FOR SHARING APPLICATION, AND APPLICATION SERVICE PLATFORM

(71) Applicant: BEIJING QIHOO TECHNOLOGY COMPANY LIMITED, Beijing (CN)

(72) Inventors: Wei Dong, Beijing (CN); Lei Liu, Beijing (CN); Wentong Liu, Beijing (CN); Yunyan Hu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/524,867

(22) PCT Filed: Sep. 25, 2015

(86) PCT No.: PCT/CN2015/090821
§ 371 (c)(1),
(2) Date: May 5, 2017

(87) PCT Pub. No.: WO2016/070689
PCT Pub. Date: May 12, 2016

(65) Prior Publication Data
US 2017/0346671 A1 Nov. 30, 2017

(30) Foreign Application Priority Data

Nov. 6, 2014 (CN) .......................... 2014 1 0638403

(51) Int. Cl.
*G06F 15/16* (2006.01)
*H04L 29/08* (2006.01)
*G06F 17/30* (2006.01)

(52) U.S. Cl.
CPC .. *H04L 29/08081* (2013.01); *G06F 17/30165* (2013.01)

(58) Field of Classification Search
CPC .............. H04L 29/08081; G06F 17/30165
(Continued)

(56) References Cited

U.S. PATENT DOCUMENTS 8,554,836 B1 * 10/2013 Wilson ............... G06Q 30/0214
709/203
9,339,733 B2 * 5/2016 Boudville ............. A63F 13/335
(Continued)

FOREIGN PATENT DOCUMENTS

CN 103034530 4/2013
CN 103188328 7/2013
(Continued)

OTHER PUBLICATIONS

International Search Report and Written Opinion for corresponding International Application No. PCT/CN2015/090821, dated Dec. 31, 2015.

*Primary Examiner* — Imad Hussain
(74) *Attorney, Agent, or Firm* — Alston & Bird LLP

(57) ABSTRACT

Embodiments of the present invention provide a method and a system for sharing an application, and an application service platform. The method comprises: an application service platform, according to an application-sharing request sent from a source client, generates an application-sharing link containing an identifier of the source client, and returns the application-sharing link to the source client; the source client shares the sharing link with the target client; the application service platform, after receiving the connection request to the sharing link sent by the target client, generates an application installation package carrying the identifier of the source client, and returns the application installation package to the target client; the target client installs the application according to the installation package; an application service platform, after receiving an application login request sent by the target client, builds a friend-relationship
(Continued)

between a user of the source client and a user of the target client according to the identifier of the source client carried in the application login request. The present invention, by means of application sharing, is able to facilitate establishment of a friend-relationship, enhances application interaction, and improves user experience.

17 Claims, 5 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 2009/0111581 | A1* | 4/2009 | Ostergren | ............... A63F 13/12 463/42 |
| 2012/0035990 | A1* | 2/2012 | Lewis | ............... G06Q 30/0207 705/14.1 |
| 2012/0316941 | A1* | 12/2012 | Moshfeghi | ............ G06Q 30/02 705/14.16 |
| 2013/0018948 | A1 | 1/2013 | Douillet et al. | |
| 2013/0079149 | A1* | 3/2013 | Fletcher | ................. G06Q 50/01 463/42 |
| 2013/0331179 | A1 | 12/2013 | Taylor et al. | |
| 2014/0006517 | A1* | 1/2014 | Hsiao | ..................... G06Q 50/01 709/205 |
| 2015/0039433 | A1* | 2/2015 | Raina | ...................... H04L 51/24 705/14.55 |
| 2015/0264094 | A1 | 9/2015 | Huang et al. | |
| 2015/0286737 | A1* | 10/2015 | Cattone | ............... G06F 3/04842 715/234 |
| 2016/0063540 | A1* | 3/2016 | Luan | .................. G06Q 30/0247 705/14.46 |
| 2016/0110775 | A1* | 4/2016 | Moiz | ................. G06Q 30/0277 705/14.73 |

FOREIGN PATENT DOCUMENTS

| | | |
|---|---|---|
| CN | 103475635 | 12/2013 |
| CN | 103812753 | 5/2014 |
| CN | 104333599 | 2/2015 |
| EP | 2725761 | 4/2014 |
| WO | WO 2005112586 | 12/2005 |

* cited by examiner

METHOD AND SYSTEM FOR SHARING APPLICATION, AND APPLICATION SERVICE PLATFORM

FIELD OF THE INVENTION

The present invention relates to the Internet technologies, and specifically to a method and system for sharing an application, and an application service platform.

BACKGROUND OF THE INVENTION

With the popularization of the internet, social applications in Social Network Sites (SNS) develop rapidly. For example, some game applications in social network sites appeal to a large number of users in the social network sites as having characteristics such as simple and easy to play for beginners and emphasis on interaction between users. Therein, sharing an application with friends is a general social interaction manner. A sharing behavior can not only spread the application and improve popularity of the application, but also enable the user sending the sharing to win an award such as props or virtual currency, and improve the user's loyalty to a certain degree.

At present, the social platform provides a game-sharing function for some game applications. Usually, a game user in the social platform clicks game-sharing operation and shares the game with friends in the platform through the game-sharing function provided by the social platform. After the friends receive the game shared by the user, they may download and install the game application according to their own needs and thereby complete the game-sharing operation. As for friends not in the social platform, the game user may achieve game sharing by copying a game-sharing link. As for friends in the social platform, a friend-relationship between users of the game application may be automatically built according to its original social platform friend-relationship. For example, a friend-relationship between users of a QQ game application is automatically built relying on a friend-relationship of the QQ chat application.

However, only depending on the friend-relationship of the original social platform when the game application is shared between friends in the same social platform, the current method of sharing the game application can build a friend-relationship between a user of providing game application sharing and a user of accepting the sharing. If the user of accepting the sharing is by no means associated with the user of providing the game application sharing in advance, the game friend-relationship is very difficult to be built, thereby reducing interaction of the game application and causing undesirable user experience.

To sum up, it is necessary to provide a method capable of conveniently building a friend-relationship between users of the application by sharing the application to enhance the interaction of the application and improve the user experience.

SUMMARY OF THE INVENTION

In view of the above problems, the present invention is proposed to provide a method and system for sharing an application, and an application service platform, which can overcome the above problems or at least partially solve the above problems, and which can conveniently implement automatic building of a friend-relationship between users of the application by sharing the application, enhance the interaction of the application and improve the user experience.

According to an aspect of the present invention, there is provided a method for sharing an application, comprising:

according to an application-sharing request sent from a source client, generating an application-sharing link containing an identifier of the source client, and returning the application-sharing link to the source client so that the source client shares the application-sharing link with a target client;

after receiving a connection request to the sharing link sent by the target client, generating an application installation package carrying the identifier of the source client, and returning the application installation package to the target client, so that the target client installs the application according to the application installation package;

after receiving an application login request sent by the target client, building a friend-relationship between a user of the source client and a user of the target client according to the identifier of the source client and an identifier of the target client carried in the application login request.

According to another aspect of the present invention, there is provided a system for sharing an application, comprising a source client, an application service platform and a target client; wherein, the source client is configured to send an application-sharing request;

the application service platform is configured to, according to the application-sharing request sent from the source client, generate an application-sharing link containing an identifier of the source client, and return the application-sharing link to the source client;

the source client is further configured to share the sharing link returned by the application service platform with the target client;

the application service platform is further configured to, after receiving the connection request to the sharing link sent by the target client, generate the application installation package carrying the identifier of the source client, and return the application installation package to the target client;

the target client is configured to install the application according to the application installation package returned from the application service platform, and configured to send a login request carrying an identifier of the source client;

the application service platform is further configured to, after receiving the application login request sent by the target client, build a friend-relationship between a user of the source client and a user of the target client according to the identifier of the source client and an identifier of the target client carried in the login request.

According to a further aspect of the present invention, there is provided an application service platform, comprising:

an application management server configured to, according to the application-sharing request sent from a source client, generate an application-sharing link containing an identifier of the source client, and return the application-sharing link to the source client so that the source client shares the sharing link with a target client; and further configured to, after receiving an application login request sent by the target client, send a friend making notification including the identifier of the source client and an identifier of the target client carried in the application login request;

an application download server configured to, after receiving a connection request to the sharing link sent by the target client, generate an application installation package carrying the identifier of the source client according to the identifier of the source client in the sharing link, and return the application installation package to the target client;

an application friends server configured to, after receiving the friend making notification, build a friend-relationship between a user of the source client and a user of the target client according to the identifier of the target client and the identifier of the source client in the friend making notification.

According to another aspect of the present invention, there is provided a computer program which comprises a computer-readable code, the computer-readable code, when running on a computing device, causing the computing device to execute the method for sharing the application recited in the preceding text.

According to a further aspect of the present invention, there is provided a computer readable medium which stores the aforesaid computer program.

Advantageous effects of the present invention are as follows:

In the solutions of embodiments of the present invention, in a manner that the application-sharing link carries the identifier information of the user sharing the application and the installation package used by the sharing-accepting user in installing the application carries the identifier information of the user sharing the application, the friend-relationship between the user sharing the application and the sharing-accepting user may be automatically built, thereby implementing automatic building of the friend-relationship in an application-sharing manner, providing great convenience, enhancing the interaction of the application and improving the user experience.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and should not be construed as limiting the present invention. In all figures, the similar reference numbers denote the substantially similar elements. In the figures.

DETAILED DESCRIPTION OF THE INVENTION

The present invention will be further described below in conjunction with figures and specific embodiments.

In the present invention, a user may send an application-sharing request to an application service platform by an application client, the application service platform generates a sharing link containing an identifier of the application sharer, and sends the application-sharing link to other users through some channels, to invite these users to become users of the application. When there is a user clicking the application-sharing link and downloading the application, the application service platform generates an installation package containing the identifier of the application sharer, and returns the installation package to the user. As such, when the user installs the application and logs in the application, the application service platform may directly build a friend-relationship between the user and the application sharer according to the identifier of the application sharer carried in a login request.

Since the manner of carrying the identifier of the application sharer in the application-sharing link and in the application installation package, the friend-relationship between the application sharer and the share receiver (namely, the user of downloading and installing the application through the sharing-link) may be built conveniently, which provides great convenience, enhances the interaction of the application, and improves the user experience.

Figure 1:
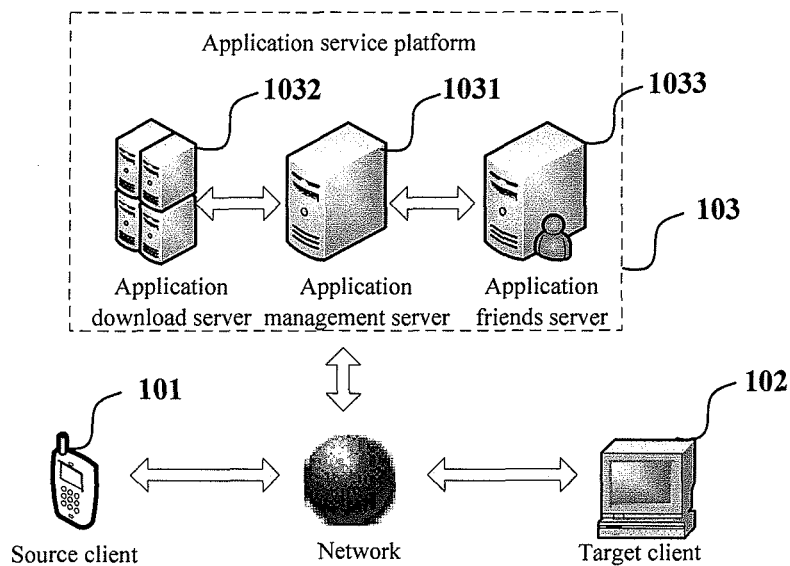
FIG. 1 is an architecture diagram of a system for sharing an application according to an embodiment of the present invention.

Technical solutions of the present invention will be described in detail with reference to figures. The present invention provides a system for sharing an application, and the system is structured as shown in FIG. 1 and comprises: a source client 101, a target client 102 and an application service platform 103, wherein the source client and the target client may be a mobile terminal or a PC (personal computer) terminal respectively, which is not limited in the present invention.

The source client 101 is used to send an application-sharing request to the application service platform 103; and share a sharing link returned by the application service platform 103 with the target client 102. Preferably, the source client 101 is specifically used to share the sharing link with the target client 102 through at least one sharing channel. The sharing channels may include: short message, circle of friends, WeChat friends and SINA microblog. This is not limited in the present invention.

The target client 102 is configured to install the application according to the application installation package returned from the application service platform 103. The target client 102 is further configured to send the application service platform 103 a login request carrying an identifier of the source client 101 and an identifier of the target client 102.

The application service platform 103 is configured to, according to the application-sharing request sent from the source client 101, generate an application-sharing link containing the identifier of the source client 101, and return the application-sharing link to the source client 101; and further configured to, after receiving a connection request to the sharing link sent by the target client 102, generate an application installation package carrying the identifier of the source client 101 and return the application installation package to the target client 102; and further configured to, after receiving an application login request sent by the target client 102, build a friend-relationship between the user of the source client 101 and the user of the target client 102 according to the identifier of the source client 101 and an identifier of the target client 102 carried in the login request.

Specifically, the application service platform 103 comprises: an application management server 1031, an application download server 1032 and an application friends server 1033.

The application management server 1031 is configured to, according to the application-sharing request sent from the source client 101, generate an application-sharing link containing the identifier of the source client 101, and return the application-sharing link to the source client 101 so that the source client 101 will share the sharing link with the target client 102; furthermore, the application management server 1031 is further configured to, after receiving an application login request sent by the target client 102, send a friend making notification including the identifier of the source client 101 and the identifier of the target client 102 carried in the login request.

Preferably, after the friend-relationship between the user of the source client 101 and the user of the target client 102 is built, if the application management server 1031 receives the application login request sent by the source client 101, the application management server 1031 is further configured to send the source client 101 a newly-added friend notification including a name (e.g., user name or nickname) of the user of target client 102.

Preferably, the application management server 1031 is further configured to perform statistics of the number of application friends newly made by the user of the source client 101 after the source client 101 sends the application-sharing request, and consider the number obtained from the statistics as the number of newly-added friends of the user of the source client 101; and after receiving the application login request sent by the source client 101, return the newly-added friend notification including the number of newly-added friends to the source client 101.

Preferably, the application management server 1031 is further configured to, after receiving the application login request sent by the source client 101, present corresponding award to the user of the source client 101 according to the number of newly-added friends obtained from the statistics of the user of the source client 101, and return an application award notification to the source client 101.

The application download server 1032 is configured to, after receiving the connection request to the sharing link sent by the target client 102, generate the application installation package carrying the identifier of the source client 101 according to the identifier of the source client 101 in the sharing link, and return the application installation package to the target client 102, the application packaging being used to install the application. Furthermore, the sharing link is directed to a profile page of the application. Correspondingly, the application download server 1032 is specifically configured to, after receiving the sharing link connection request sent by the target client 102, return the profile page of the application to the target client 102; and after receiving an application-download request sent by the target client 102 through the profile page, generate the application installation package carrying the identifier of the source client 101, and return the application installation package to the target client 102.

The application friends server 1033 is configured to, after receiving the friend making notification sent by the application management server 1031, establish the friend-relationship between a user of the source client 101 and a user of the target client 102 according to the identifier of the target client 102 and the identifier of the source client 101 in the friend making notification.

Preferably, the application friends sever 1033 is specifically configured to, after receiving the friend making notification sent by the application management server 1031, look up from a friend-relationship database whether a correspondence relationship between the identifier of the source client 101, the identifier of the target client 102 and an identifier of the application is stored; if there is not such correspondence relationship, build the friend-relationship between the user of the source client 101 and the user of the target client 102, and record, in the friend-relationship database, the correspondence relationship between the identifier of the source client 101, the identifier of the target client 102 and the identifier of the application.

Figure 2A:
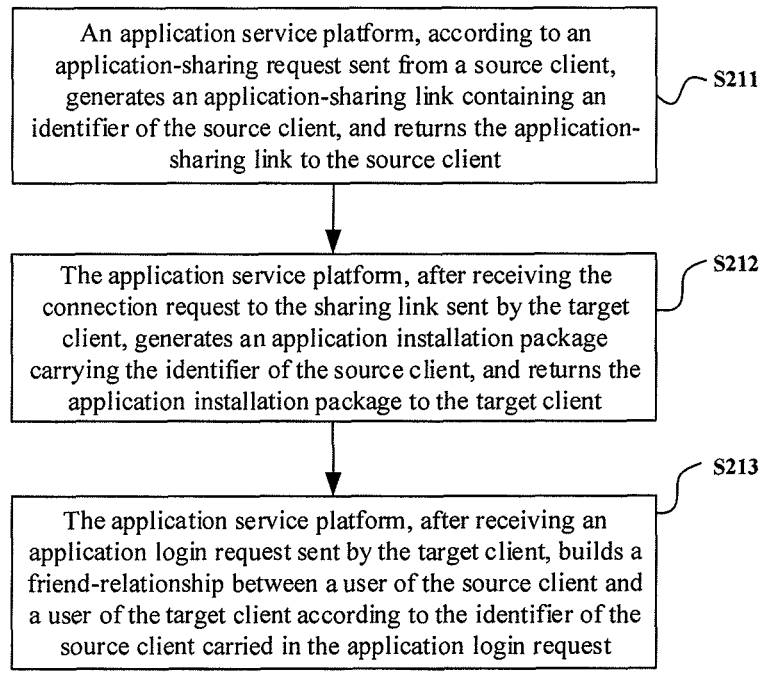
FIG. 2a is a flow chart of a method for sharing an application according to an embodiment of the present invention.

Based on the above system for sharing an application, the present invention provides a flow chart of a method for sharing an application comprising the following steps S211-S213 as shown in FIG. 2a:

Step S211: the application service platform 103 is configured to, according to the application-sharing request sent from the source client 101, generate an application-sharing link containing the identifier of the source client 101, and return the application-sharing link to the source client 101;

Specifically, the user may send the application-sharing request to the application service platform 103 through the source client 101. Furthermore, after the application service platform 103 returns the generated application-sharing link to the source client 101, the source client 101 shares the application-sharing link with the target client 102.

Step S212: the application service platform 103, after receiving the connection request to the sharing link sent by the target client 102, generates the application installation package carrying the identifier of the source client 101, and returns the application installation package to the target client 102.

Specifically, after the target client 102 receives the application-sharing link shared by the source client 101, the user may send the application-sharing link connection request to the application service platform 103. After the application service platform 103 returns the generated application installation package to the target client 102, the target client 102 installs the application according to the application installation package.

Step S213: the application service platform 103, after receiving the application login request sent by the target client 102, builds a friend-relationship between a user of the source client 101 and a user of the target client 102 according to the identifier of the source client 101 and the identifier of the target client 102 carried in the login request.

Specifically, after the target client 102 installs the application, the user may log in the application through the target client 102, namely, sends the application login request to the application service platform 103. Therefore, the application service platform 103 may, according to the login request sent by the target client 102, build the friend-relationship between the user of the source client 101 and the user of the target client 102.

Figure 2B:
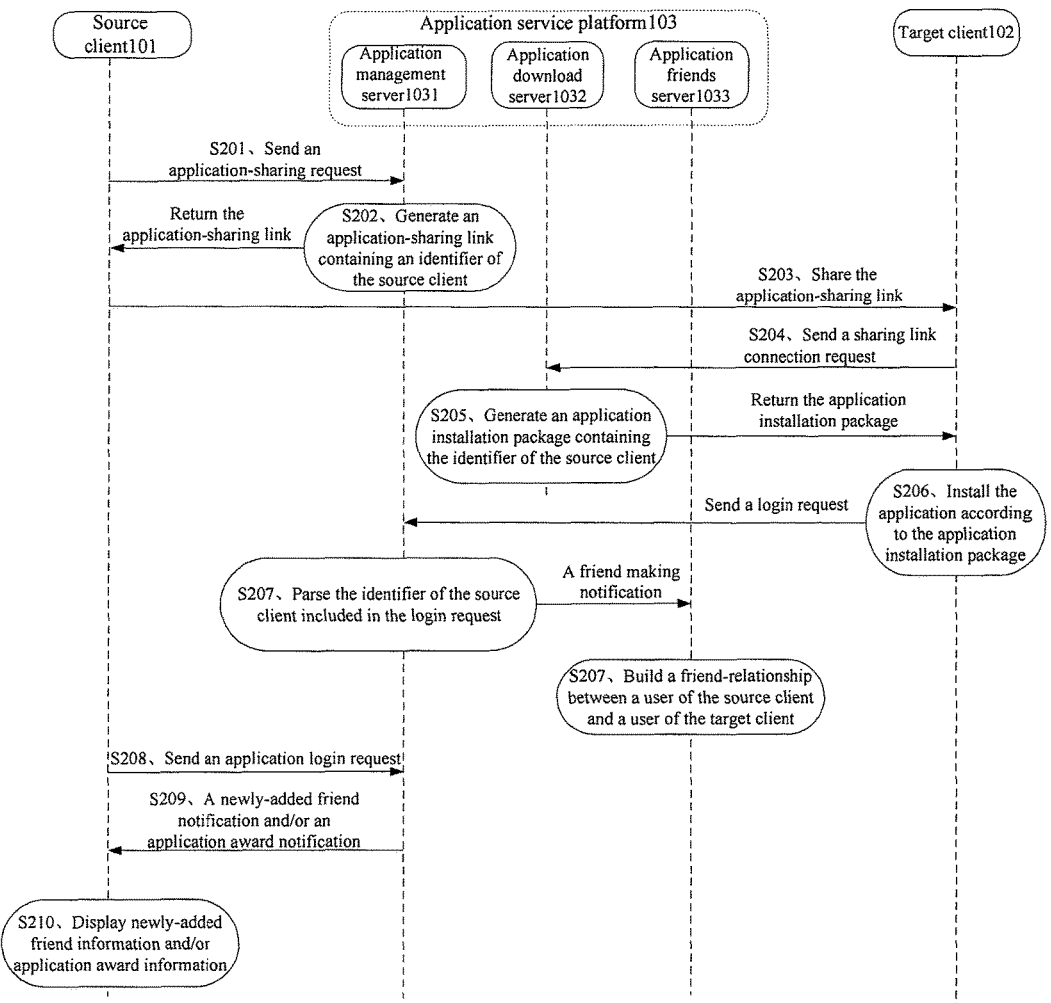
FIG. 2b is an another flow chart of a method for sharing an application according to an embodiment of the present invention.

The method for sharing the application to add friends is illustrated below by describing the interaction between the source client, the target client and the application service platform in detail. Specifically, the flowchart of the above method of sharing the application to add friends comprises the following steps S201 to S210 as shown in FIG. 2b:

Step S201: the source client 101 sends the application-sharing request to the application service platform 103.

Figure 3:
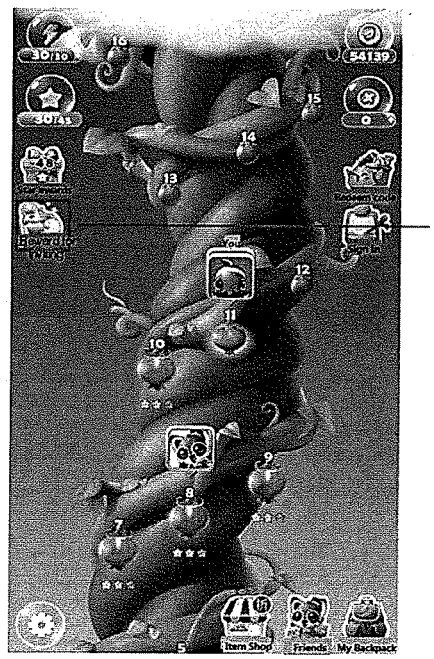
FIG. 3 is a schematic diagram of an invite-award button in an application interface according to an embodiment of the present invention.

Specifically, when the user wants to share the application, he may click "invite-award (or share-award)" button in the application interface of the application client to send an application-sharing instruction to the application client. FIG. 3 shows a schematic diagram of an interface of a game application. A game user may click the invite-award button in the interface to perform the sharing of the game application. In the text, the application client used by the user initiatively sharing the application (namely, the application sharer) is called the source client, and the user initiatively sharing the application is called the user of the source client.

In this step, the source client 101 may, according to the application-sharing instruction sent by the user, invoke a sharing interface provided by a SDK (Software Development Kit), and send the application-sharing request to the application management server 1031 in the application service platform 103 through a network. The application-sharing request carries the identifier of the source client 101 and the identifier of the application, wherein the identifier of the source client 101 is a unique identifier of the user of the source client 101 in the application, for example ID, and the identifier of the application is a sole identifier of the application in the application service platform 103.

After the user clicks the "invite-award" button in the application interface, if the source client 101 detects network abnormity, it return prompt information that "the network environment is not interconnected. Please check and retry" to the user through the application interface.

Step S202: after receiving the application-sharing request, the application service platform 103 generates the application-sharing link containing the identifier of the source client 101, and returns the application-sharing link to the source client 101.

In this step, after receiving the application-sharing request, the application management server 1031 in the application service platform 103 parses the identifier of the source client 101 from the application-sharing request, generates the application-sharing link containing the identifier of the source client 101, and returns the application-sharing link (namely, url, uniform resource locator) to the source client 101. Furthermore, the application management server 1031 may convert the application-sharing link into a shortened link and returns it to the source client 101.

Specifically, the application-sharing link may consist of the identifier of the source client 101, a profile page address of the application and the identifier of the application. That is to say, the application-sharing link is directed to the profile page of the application. Usually, the profile page of the application briefly introduces functions, attribution information and the like of the application so that the user roughly learns about the application, and may further provide a download link of the application.

After receiving the application-sharing request, the application management server 1031 in the application service platform 103 may obtain the identifier of the source client 101 and the identifier of the application from the application-sharing request, and look up a sharing page address configuration item of the application according to the identifier of the application in the sharing request. Usually, the application management server 1031 configures the sharing page address configuration item of the application as the profile page address of the application. Therefore, the application management server 1031 may, according to the found sharing page address configuration item, generate a sharing link containing the profile page address of the application, the identifier of the source client 101 and the identifier of the application, and the application-sharing link is directed to the profile page of the application. The application management server 1031 may further set the sharing page address configuration item for each application. If the sharing page configuration item is not configured for a certain application, its page configuration item is set as a default value.

Step 203: the source client 101 shares the application-sharing link with the target client 102.

Figure 4:
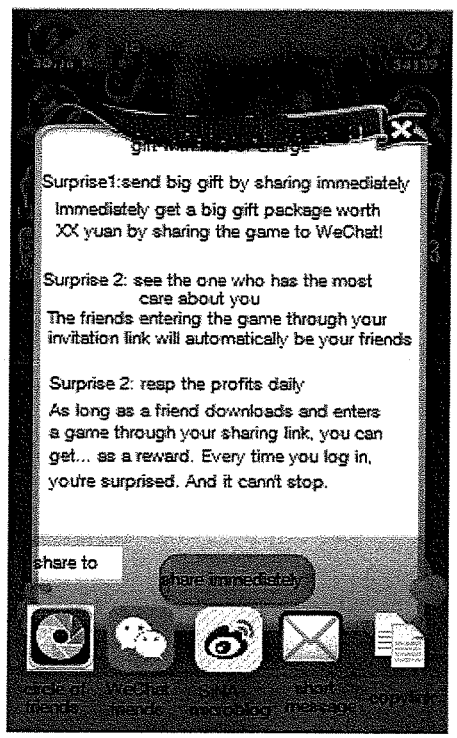
FIG. 4 is a schematic diagram showing icons of sharing channels and an immediate share button according to an embodiment of the present invention.

After the source client 101 receives the application-sharing link returned by the application management server 1031 in the application service platform 103, the source client 101 shares the received application-sharing link with the target client 102 in many manners. Specifically, as shown in FIG. 4, the user of the source client 101 may select a sharing channel to be used from sharing channel icons displayed in the application interface, and click a "share immediately" button. The source client 101 shares the application-sharing link with the target client 102 through the sharing channel selected by the user. The sharing channel may include, but not limited to, short message, WeChat friends, SINA microblog, and circle of friends. Furthermore, the source client 101 shares the application-sharing link with a plurality of target clients 102.

For example, according to the user-selected short message sharing channel and a mobile phone number of an input contact, the source client 101 invokes a system interface and sends the application-sharing link to the corresponding contact through the short message; the application client used by the corresponding contact is considered as the target client 102;

Or, the source client 101 sends the application-sharing link to a corresponding WeChat friend in the form of a WeChat message according to the user-selected WeChat friend sharing channel and an input WeChat friend account; the application client used by the corresponding WeChat friend is the target client 102;

Or, the source client 101 publishes the application-sharing link on a Microblog platform according to a user-selected microblog sharing channel and in a manner of webpage authorization. The client used by the user who can get the published sharing link may serve as the target client 102.

As shown in FIG. 4, icons of multiple sharing channels may be displayed in a row of an application interface, and spacing between the icons may be adaptively adjusted according to a width of the display screen. If the application client detects that the user does not configure signature information of a certain sharing channel, or the user does not install a WeChat client, or the mobile phone does not have a SIM card, the application client does not display a corresponding sharing channel icon, and icons that follow move leftward in turn. Furthermore, the application client supports a duplication operation of the sharing link. An icon for the duplication operation may also be displayed in a row of the application interface together with the sharing link icons. The user may select a sharing channel by clicking an icon of the sharing channel.

Preferably, in practical application, the source client 101 may send the target client 102 sharing content with the application-sharing link being included therein. Specifically, after receiving the application-sharing link returned by the application management server 1031 in the application service platform 103, the source client 101 generates the corresponding sharing content including the application-sharing link, in conjunction with the user-selected sharing channel. For example, when the sharing channel is WeChat friends or the circle of WeChat friends, the sharing content may consist of a title, text, application logo and an application-sharing link; when sharing channel is SINA microblog, short message or the like, the sharing content may consist of the text and the application-sharing link. The title, text and application logo in the sharing content may be obtained in a way that the source client 101 transfers application parameters. The text may be brief advertisement content of the sharing activity, for example, "XXX application may be downloaded from an official website free of change, and an award will be won if playing XXX with friends", or some content what the user inputs in an input box of "sharing description" of the source client 101, for example, "this application is of great fun, and you can come download and play it".

Furthermore, if the source client 101 detects failure to send the application-sharing link to the target client 102 through the corresponding sharing channel after the user clicks the icon of the sharing channel, the source client 101 returns a prompt message "Sharing fails. Please retry later" to the user through the application interface. For example, if the application interface still displays the icon of the sharing channel WeChat friends after the user uninstalls the WeChat client, the source client 101 will return the prompt message "Sharing fails. Please retry later" to the user.

Step S204: the target client 102 sends the application-sharing link connection request to the application service platform 103.

After the target client 102 receives the application-sharing link sent by the source client 101, if the user of the target client 102 wants to download the application, he may click and access the sharing link of the application, and the target client 102 sends the application-sharing link connection request to the application download server 1032 in the application service platform 103.

Step S205: the application service platform 103 parses the application-sharing link, and generates an application installation package and returns it to the target client 102.

After receiving the application-sharing link connection request, the application download server 1032 in the application service platform 103 parses the application-sharing link to get the identifier of the source client 101, directly generates the application installation package including the identifier of the source client 101, and returns it to the target client 102.

Furthermore, after receiving the application-sharing link connection request, the application download server 1032 in the application service platform 103 parses to get an application profile page address in the application-sharing link, and returns the application profile page to the target client 102 according to the application profile page address obtained from the parsing. After receiving a download request sent by the target client 102 through the application profile page, the application download server 1032 in the application service platform 103 generates the application installation package including the identifier of the source client 101, and returns the application installation package to the target client 102. So, the user of the target client 102 may learn about functions, attribute information and the like of the application through the application profile page, further confirm it necessary to download the application, and then click a download button or download link in the application profile page, and send an application download request to the application download server 1032.

Step S206: the target client 102 installs the application and sends an application login request to the application service platform 103.

Specifically, after obtaining the application installation package, the target client 102 completes installation of the application by using the application installation package. When the user of the target client 102 logs in the application, the target client 102 sends the login request to the application management server 1031 in the application service platform 103, wherein the sent login request carries the identifier of the source client 101. Preferably, upon detecting the user logs in the application for the first time, the target client 102 may send the application login request with the identifier of the source client 101 carried in the application installation package, to the application management service 1031 in the application service platform 103.

Step S207: according to the identifier of the source client 101 carried in the login request sent by the target client 102, the application service platform 103 builds a friend-relationship between the user of the source client 101 and the user of the target client 102.

Specifically, after receiving the login request sent by the target client 102, if the application management server 1031 detects that the login request carries the identifier of the source client 101, the application management server 1031 in the application service platform 103 puts the identifier of the target client 102 and the identifier of the source client 101 in a friend making notification, and sends it to the application friends server 1033 in the application service platform 103. After receiving the friend making notification, the application friends server 1033 in the application service platform 103, according to the identifier of the target client 102 and the identifier of the source client 101, builds a friend-relationship between the user of the target client 102 and the user of the source client 101, and stores the built friend-relationship in a friend-relationship database, wherein the identifier of the target client 102 is a solve identifier of the user of the target client 102 in the application.

Preferably, before building the friend-relationship between the user of the target client 102 and the user of the source client 101, the application friends server 1033 in the application service platform 103 may first look up from the friend-relationship database whether a correspondence relationship between the identifier of the source client 101, the identifier of the target client 102 and the identifier of the application is stored; if there is not such correspondence relationship, build the friend-relationship between the user of the source client 101 and the user of the target client 102, and record, in the friend-relationship database, the correspondence relationship between the identifier of the source client 101, the identifier of the target client 102 and the identifier of the application; if there is such correspondence relationship, which indicates that the user of the target client 102 and the user of the source client 101 have already built the friend-relationship by sharing the application, no longer re-build the friend-relationship between the two.

Figure 5:
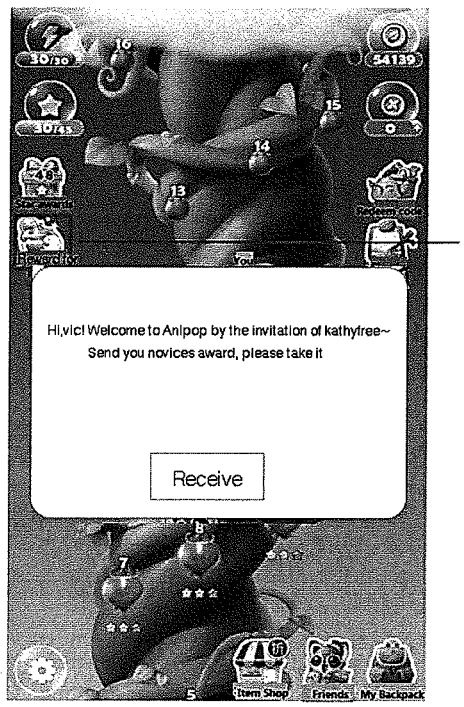
FIG. 5 is schematic diagram showing a prompting box including novice's award information according to an embodiment of the present invention.
Figure 6:
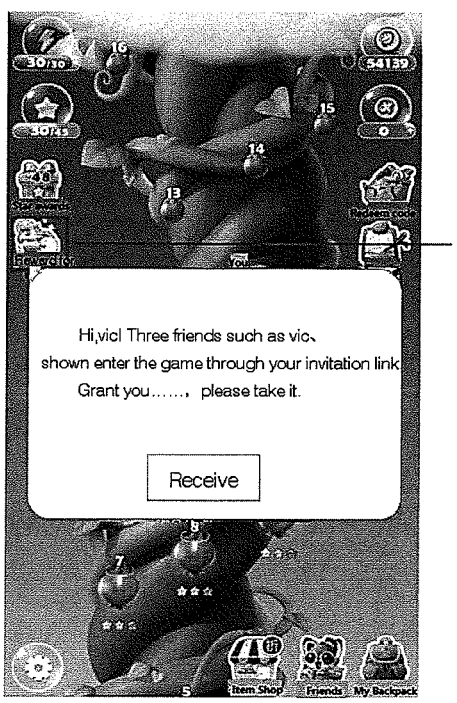
FIG. 6 is a schematic diagram showing a prompting box including newly-added friend information and application award information according to an embodiment of the present invention.

Preferably, after building the friend-relationship between the user of the source client 101 and the user of the target client 102, the application service platform 103 may further offer certain new user award to the user of the target client 102, for example, props, virtual currency or the like, and returns the target client 102 a novices award notification including the award information and the name of the user of the source client 101. The target client 102 may display a prompt box including the novices award information in the application interface. FIG. 5 is schematic diagram showing a prompt box including the novices award information and the name of the user of the source client 101.

Furthermore, as for a target client 102 installed on a terminal equipment such as a mobile phone, the target client 102 may, upon logging in the application, encrypt an IMEI (International Mobile Equipment Identification Number) of the terminal device and report it to the application service platform 103. The application service platform 103 may, according to the encrypted IMEI reported by the target client 102, determine whether an association relationship between the application and the encrypted IMEI has been recorded. If there is not such association relationship, the application service platform 103 maintains the identifier of the application, the identifier of the target client 102, the identifier of the source client 101 and the encrypted IMEI of the terminal equipment as the association relationship; if there is such association relationship, the application service platform 103 does not present an award to the user of the target client 102 any longer, and returns the target client 102 a notification to the effect that a sharing invention will not be accepted any more. This may prevent the user from repeatedly downloading the application installation package by accepting the sharing on the terminal equipment such as a mobile phone to win an award.

Step S208: the source client 101 sends the application login request to the application service platform 103.

When the user of the source client 101 shares the application and then logs in the application again, the source client 101 sends the application login request to the application management server 1031 in the application service platform 103.

Step S209: according to the login request sent by the source client 101, the application service platform 103 returns a newly-added friend notification and/or application award notification to the source client 101.

Specifically, the application management server 1031 in the application service platform 103 may return the newly-added friend notification to the source client 101 with the name (user name or nickname) of the user of the target client 102 in the newly-added friend notification.

In fact, the application management server 1031 in the application service platform 103 may record names of all friends made by sharing a game after the user of the source client 101 shares the game, and may perform statistics of the number of friends made by the user of the source client 101 by sharing the application after the source client 101 sends the sharing request, as the number of newly-added friends of the user of the source client 101. After receiving the login request of the source client 101, the application management server 1031 in the application service platform 103 returns the newly-added friend notification to the source client 101 including the number of newly-added friends of the user of the source client 101 and the names of newly-added friends of the user of the source client 101.

Furthermore, to improve the user's loyalty and the interaction of the application, the application service platform 103 may further, after receiving the application login request sent by the source client 101, present corresponding award such as application props or virtual currency to the user of the source client 101 according to the number of newly-added friends obtained from the statistics of the user of the source client 101, and return the application award notification including the award information to the source client 101.

The newly-added friends notification and the application award notification may be sent in two notifications, or merged into one notification and sent.

Step S210: the source client 101 displays newly-added friend information and/or application award information.

After receiving the newly-added friend notification, the source client 101 may display, in the application interface, a prompt box including the names of newly-added friends and the number of newly-added friends of the user of the source client 101, wherein the names of newly-added friends of the user of the source client 101 include the name of the user of the target client 102.

When the number of newly-added friends is plural, the source client 101 may arrange and display the names of newly-added friends in an inverted order of the time of building the friend-relationship (namely, a manner of ranking the names with the name of the newest friend ranking at the top), and omit the names of users displayed earlier in a " . . . " or "etc." manner when the number of newly-added friends is larger than a preset value.

Furthermore, after receiving the application award notification, the source client 101 may display, in the application interface, a prompt box including the award information.

As shown in FIG. 5, after receiving the newly-added friend notification and the application award notification, the source client 101 may display, in a prompt box, names and number of the newly-added friends of the user of the source client 101 and the award information.

The aforesaid application may be specifically a game application. For example, when the game application is "Allstar Heroes" game, the method of adding friends by sharing the application according to the present invention is illustrated by way of example:

While user A is playing the Allstar Heroes game, he uses the game-sharing function and shares the game in a form of a short message, the sharing link is http://map.m.360.cn/t/qcFaM, and the sharing link is generated by the game service platform and includes the identifier information of the user A; user B receives the sharing link through the short message, opens and downloads the Allstar Heroes application; after user B logs in the Allstar Heroes game, he automatically builds a game friend-relationship with user A; after user A logs in the Allstar Heroes game again, he knows that his sharing has already been accepted by user B and obtains a game award.

To conclude, in a manner that the application-sharing link carries the identifier information of the user of sharing the application and the installation package used by the sharing-accepting user in installing the application carries the identifier information of the user sharing the sharing, the friend-relationship between the user of sharing the application and the sharing-accepting user may be automatically built, thereby implementing automatic building of the friend-relationship in the application-sharing manner, providing great convenience, enhancing the interaction of the application and improving the user experience.

The description as provided here depicts a lot of specific details. However, it is appreciated that embodiments of the present invention may be implemented in the absence of these specific details. Some embodiments do not specify detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 7:
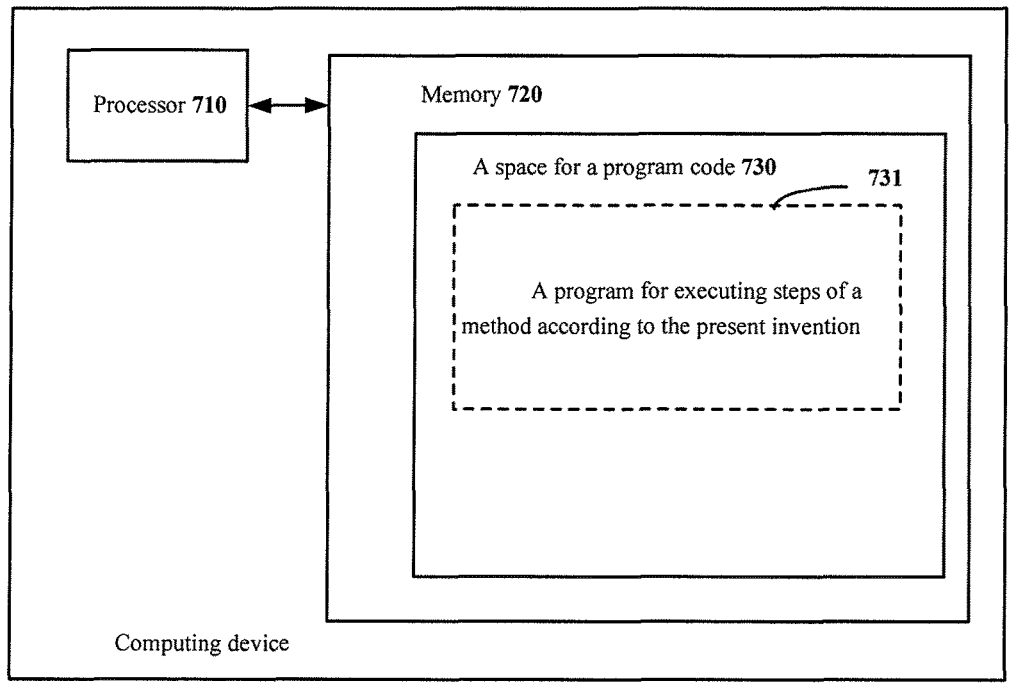
FIG. 7 illustrates a block diagram of a computing device for executing the method for sharing an application according to the present invention.
Figure 8:
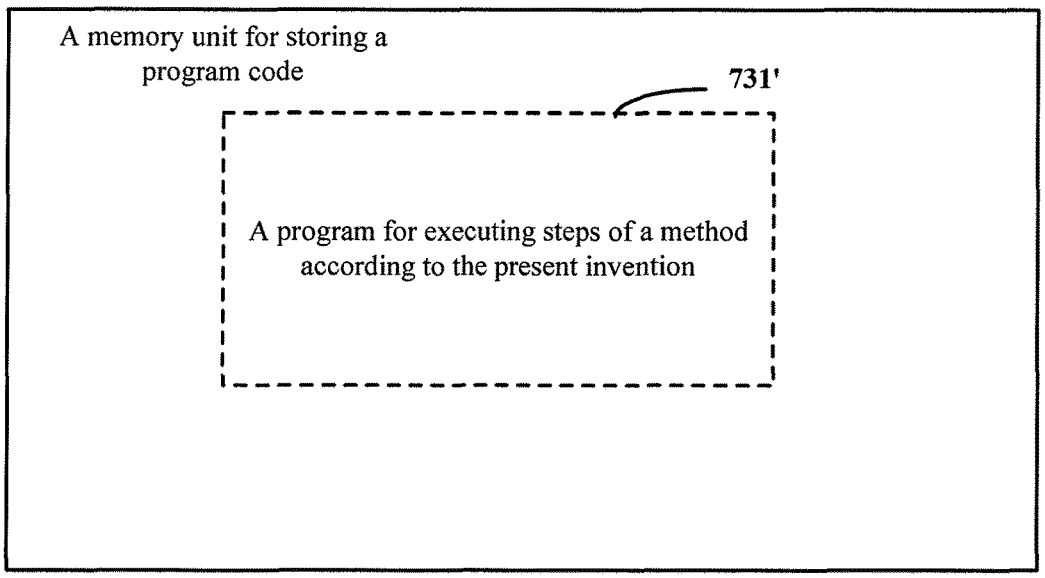
FIG. 8 illustrates a memory unit for maintaining or carrying a program code for implementing the method for sharing an application according to the present invention.

For example, FIG. 7 illustrates a computing device for implementing the method for sharing an application according to the present invention. The computing device conventionally comprises a processor 710 and a computer program product or computer-readable medium in the form of a memory 720. The memory 720 may be a flash memory, EEPROM (Electrically Erasable Programmable Read-Only Memory), EPROM, hard disk or ROM-like electronic memory. The memory 720 has a storage space 730 for a program code 731 for executing any step of the above method. For example, the storage space 730 for the program code may comprise program codes 731 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 8. The memory unit may have a storage section, a storage space or the like arranged in a similar way to the memory 720 in the server of FIG. 7. The program code may for example be compressed in a suitable form. Usually, the memory unit includes a computer-readable code 731', namely, a code readable by a processor such as 710. When these codes are run by the computing device, the computing device is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many-modifications and variations without departing from the scope and spirit of the appended claims are obvious. The disclosure of the present invention is intended to be illustrative, but not limiting, of the scope of the invention, which is set forth in the claims.

The invention claimed is:

1. A method for sharing an application, which applied to an application service platform and comprising:
 according to an application-sharing request sent from a source client, generating an application-sharing link containing an identifier of the source client, and returning the application-sharing link to the source client so that the source client shares the application-sharing link with a target client;
 after receiving a connection request to the sharing link sent by the target client, generating an application installation package carrying the identifier of the source client, and returning the application installation package to the target client, so that the target client installs the application according to the application installation package;

after receiving an application login request sent by the target client, building a friend-relationship between a user of the source client and a user of the target client according to the identifier of the source client and an identifier of the target client carried in the application login request.

2. The method according to claim 1, wherein the sharing link is directed to a profile page of the application; and the step of after receiving a connection request to the sharing link sent by the target client, generating an application installation package carrying the identifier of the source client, and returning the application installation package to the target client specifically comprises:

after the application service platform receives the connection request to the sharing link sent by the target client, returning the profile page of the application to the target client; and after receiving an application-download request sent by the target client through the profile page, generating the application installation package carrying the identifier of the source client, and returning it to the target client.

3. The method according to claim 1, wherein after building a friend-relationship between a user of the source client and a user of the target client, further comprises:

after the application service platform receives the application login request sent by the source client, returning a newly-added friend notification including a name of the user of the target client to the source client.

4. The method according to claim 3, wherein the newly-added friend notification further includes the number of newly-added friends; the number of newly-added friends is the number of friends of the application newly made by the user of the source client after the source client sends the application-sharing request, the number being obtained from statistics of the application service platform.

5. The method according to claim 4, wherein after the application service platform receives the application login request sent by the source client, the method further comprises:

according to the number of newly-added friends obtained from the statistics of the user of the source client, the application service platform presenting corresponding award to the user of the source client, and returning an application award notification to the source client.

6. The method according to claim 5, wherein the method further comprises:

the source client displays, in an application interface, a prompt box including the award information, a name of the user of the target client, and the number of newly-added friends.

7. The method according to claim 1, wherein the source client sharing the sharing link with the target client specifically comprises:

the source client sharing the sharing link with the target client through at least one sharing channel, the sharing channel including: short message, circle of friends, WeChat friends and SINA microblog.

8. The method according to claim 1, wherein the building a friend-relationship between a user of the source client and a user of the target client specifically comprises:

the application service platform looking up from a friend-relationship database whether a correspondence relationship between the identifier of the source client, the identifier of the target client and an identifier of the application is stored;

if there is not such correspondence relationship, building the friend-relationship between the user of the source client and the user of the target client, and recording, in the friend-relationship database, the correspondence relationship between the identifier of the source client, the identifier of the target client and the identifier of the application.

9. A system for sharing an application, comprising a source client, an application service platform and a target client; wherein, the source client is configured to send an application-sharing request;

the application service platform is configured to, according to the application-sharing request sent from the source client, generate an application-sharing link containing an identifier of the source client, and return the application-sharing link to the source client;

the source client is further configured to share the sharing link returned by the application service platform with the target client;

the application service platform is further configured to, after receiving the connection request to the sharing link sent by the target client, generate an application installation package carrying the identifier of the source client, and return the application installation package to the target client;

the target client is configured to install the application according to the application installation package returned from the application service platform, and configured to send a login request carrying an identifier of the source client;

the application service platform is further configured to, after receiving the application login request sent by the target client, build a friend-relationship between a user of the source client and a user of the target client according to the identifier of the source client and an identifier of the target client carried in the login request.

10. The system according to claim 9, wherein the application service platform specifically comprises:

an application management server configured to, according to the application-sharing request sent from the source client, generate an application-sharing link containing the identifier of the source client, and return the application-sharing link to the source client; and further configured to, after receiving the application login request sent by the target client, send a friend making notification including the identifier of the source client and the identifier of the target client carried in the login request;

an application download server configured to, after receiving the connection request to the sharing link sent by the target client, generate the application installation package carrying the identifier of the source client according to the identifier of the source client in the sharing link, and return the application installation package to the target client;

an application friends server configured to, after receiving the friend making notification, build the friend-relationship between the user of the source client and the user of the target client according to the identifier of the target client and the identifier of the source client in the friend making notification.

11. The system according to claim 10, wherein the sharing link is directed to a profile page of the application; and the application download server is specifically configured to, after receiving the connection request to the sharing link sent by the target client, return the profile page of the application to the target client; and after receiving an application-download request sent by the target client through the profile page, generate the application installation package carrying the identifier of the source client, and return it to the target client.

12. The system according to claim 10, wherein,
after the friend-relationship between the user of the source client and the user of the target client is built, if the application management server receives the application login request sent by the source client, the application management server is further configured to return a newly-added friend notification including a name of the user of target client to the source client.

13. The system according to claim 12, wherein,
the application management server is further configured to perform statistics of the number of application friends newly made by the user of the source client after the source client sends the application-sharing request, and consider the number obtained from the statistics as the number of newly-added friends of the user of the source client; and after receiving the application login request sent by the source client, return the newly-added friend notification including the number of newly-added friends to the source client.

14. The system according to claim 13, wherein,
the application management server is further configured to, after receiving the application login request sent by the source client, present corresponding award to user of the source client according to the number of newly-added friends obtained from the statistics of the user of the source client, and return an application award notification to the source client.

15. The system according to claim 10, wherein,
the application friends sever is specifically configured to, after receiving the friend making notification, look up from a friend-relationship database whether a correspondence relationship between the identifier of the source client, the identifier of the target client and an identifier of the application is stored; if there is not such correspondence relationship, build the friend-relationship between the user of the source client and the user of the target client, and record, in the friend-relationship database, the correspondence relationship between the identifier of the source client, the identifier of the target client and the identifier of the application.

16. The system according to claim 9, wherein,
the source client is specifically configured to share the sharing link with the target client through at least one sharing channel; the sharing channel includes: short message, circle of friends, WeChat friends and SINA microblog.

17. An application service platform, comprising:
an application management server configured to, according to an application-sharing request sent from a source client, generate an application-sharing link containing an identifier of the source client, and return the application-sharing link to the source client so that the source client shares the sharing link with a target client; and further configured to, after receiving an application login request sent by the target client, send a friend making notification including the identifier of the source client and an identifier of the target client carried in the application login request;
an application download server configured to, after receiving a connection request to the sharing link sent by the target client, generate an application installation package carrying the identifier of the source client according to the identifier of the source client in the sharing link, and return the application installation package to the target client;
an application friends server configured to, after receiving the friend making notification, build a friend-relationship between a user of the source client and a user of the target client according to the identifier of the target client and the identifier of the source client in the friend making notification.

* * * * *